US009397727B1

(12) United States Patent
Mattsson et al.

(10) Patent No.: US 9,397,727 B1
(45) Date of Patent: Jul. 19, 2016

(54) SLOT ANTENNA AND NFC ANTENNA IN AN ELECTRONIC DEVICE

(71) Applicant: Amazon Technologies, Inc., Seattle, WA (US)

(72) Inventors: Ulf Jan-Ove Mattsson, Saratoga, CA (US); Chun Kit Lai, Cupertino, CA (US); Peruvemba Ranganathan Sai Ananthanarayanan, Sunnyvale, CA (US); Namhoon Kim, San Jose, CA (US); Eswarappa Channabasappa, Sunnyvale, CA (US); Adrian Napoles, Cupertino, CA (US); Anuj Dron, San Jose, CA (US); Rohit Sammeta, Mountainview, CA (US); Seng Chin Tai, Rocklin, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/567,650

(22) Filed: Dec. 11, 2014

(51) Int. Cl.
*H04B 5/00* (2006.01)
*H04B 1/40* (2015.01)
*H04W 72/04* (2009.01)

(52) U.S. Cl.
CPC ............... *H04B 5/0031* (2013.01); *H04B 1/40* (2013.01); *H04W 72/0453* (2013.01)

(58) Field of Classification Search
CPC .................................................. H01Q 13/10
See application file for complete search history.

(56) References Cited

U.S. PATENT DOCUMENTS

| | | | | |
|---|---|---|---|---|
| 2009/0256757 A1* | 10/2009 | Chiang | ............... | H01Q 13/10 343/702 |
| 2009/0256759 A1* | 10/2009 | Hill | ............... | H01Q 1/243 343/702 |
| 2012/0206302 A1* | 8/2012 | Ramachandran | ........ | H01Q 1/24 343/702 |
| 2013/0063314 A1* | 3/2013 | Whitmore | ............. | H01Q 1/242 343/702 |
| 2013/0194137 A1* | 8/2013 | Jeong | ............... | H01Q 1/243 343/702 |
| 2014/0085152 A1* | 3/2014 | Klemmensen | ........... | H01Q 1/22 343/702 |
| 2014/0159989 A1* | 6/2014 | Malek | .............. | H01Q 1/243 343/876 |
| 2014/0240176 A1* | 8/2014 | Tolbert | ............... | H01Q 1/243 343/702 |
| 2014/0266941 A1* | 9/2014 | Vazquez | ............. | H01Q 13/103 343/746 |
| 2015/0270619 A1* | 9/2015 | Zhu | ............... | H01Q 13/10 343/702 |

\* cited by examiner

*Primary Examiner* — David Bilodeau
(74) *Attorney, Agent, or Firm* — Lowenstein Sandler LLP (57) ABSTRACT

An electronic device including a Near Field Communication (NFC) antenna and a slot antenna is described. The slot antenna may be formed by a slot opening in a housing of the electronic device. The slot opening may be shaped as a rectangular slot, a T-shaped slot, or T-shaped slot leading into a circular opening. The slot opening exposes the NFC antenna and allows the NFC antenna to radiate in a first frequency band while the slot antenna radiates at a second frequency band.

20 Claims, 10 Drawing Sheets

SLOT ANTENNA AND NFC ANTENNA IN AN ELECTRONIC DEVICE

BACKGROUND

A large and growing population of users enjoys entertainment through the consumption of digital media items, such as music, movies, images, electronic books, and so on. Users employ various electronic devices to consume such media items. Among these electronic devices are electronic book readers, cellular telephones, personal digital assistants (PDAs), portable media players, tablet computers, netbooks, and the like.

These electronic devices often use wireless communication systems to download or upload digital media items or otherwise transmit information from or receive information into the device. It may be desirable for an electronic device to employ multiple wireless communication systems that support different communication protocols. In order to wirelessly communicate with other devices, these electronic devices include one or more antennas. Various types of antennas can be used in user devices.

A slot antenna typically includes a metal surface with a slot opening, hole or slot cut out. When the metal surface is driven as an antenna by a driving frequency, the slot opening radiates electromagnetic waves in a similar way to a dipole antenna. The shape and size of the slot opening, as well as the driving frequency, determine the radiation distribution pattern. A slot antenna's main advantages are its size, design simplicity, robustness and convenient adaptation to mass production.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

DETAILED DESCRIPTION

The following description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of embodiments of the present disclosure.

Embodiments of an electronic device are described which include multiple wireless communication systems. The electronic device includes a Near Field Communication (NFC) wireless communication system (herein the "NFC system") radiating in a first frequency band and a slot antenna radiating in a secondary frequency band. The NFC wireless communication system includes an antenna (herein the "NFC antenna") configured to radiate electromagnetic energy as the first frequency band (e.g., a low frequency band such as the NFC radiating frequency of approximately 13.56 MHz) in response to receiving an RF signal at one or more feed locations of the NFC system.

The slot antenna may be formed of the metal body or a metal member of the electronic device (also referred to herein as a "user device") and include a slot opening in the metal body, a capacitive element, and a feed location to be coupled to receive a secondary radio frequency (RF) signal. The slot antenna is configured to radiate electromagnetic energy in response to the RF signal. In one embodiment, the slot antenna can be configured to operate at a secondary band such as WLAN frequency bands including, but not limited to, global navigation satellite system (GNSS) (e.g., global positioning system (GPS), wireless local area network (WLAN) (e.g., the Wi-Fi® frequency bands), personal area network (PAN) (e.g., the Bluetooth® frequency bands). The slot antenna may be formed with a structural member of the user device. Alternatively, the slot antenna may be formed with a non-structural member (e.g., a separate ornamental member) of the user device. For example, the structural member may be a metallic support member that supports a display of the user device, a circuit board, or a user input device of the user device. The structural member may also be a metallic housing of the user device, a metal portion of a non-metallic housing of the user device, a metallic bezel or the like. The structural or non-structural member may be metal, metal alloy, or the like. The slot antenna may be a two-dimensional (2D) structure or a three-dimensional (3D) structure.

Figure 1:
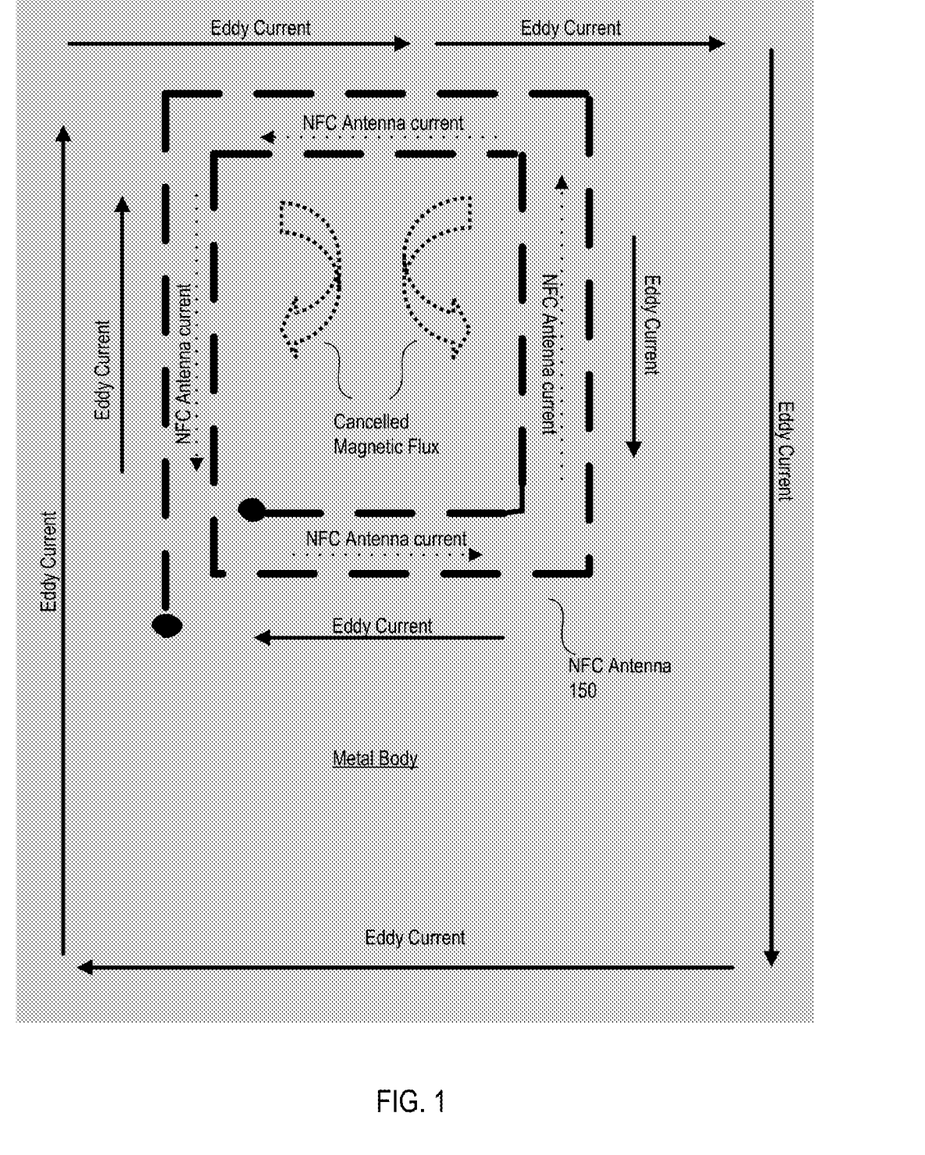
FIG. 1 illustrates a conventional electronic device including a Near Field Communication (NFC) antenna fully covered by a metal plate.

The metal body of the electronic device may pass an eddy current induced by one or more conductive elements of the electronic device. The eddy current may be induced within conductive elements of the electronic device by a changing magnetic field in the conductive elements, due to Faraday's law of induction. In an embodiment, the eddy current flows in closed loops within conductors, in planes perpendicular to the magnetic field. FIG. 1 illustrates a conventional arrangement including an NFC antenna within a closed metal body (i.e., with no opening in the metal body). As shown in FIG. 1, a current of the NFC antenna (herein the "NFC antenna current") is cancelled out by the induced eddy current of the metal body resulting in the cancellation of a magnetic flux of the NFC antenna (as depicted by the dashed lines of the cancelled magnetic flux in FIG. 1).

According to implementations of the present disclosure, the positioning of the opening in relation to the NFC antenna allows for a compact design of the electronic device and operation at both the first frequency band and the second frequency band without cancellation of the NFC antenna current by the induced eddy current. Moreover, the NFC antenna and the slot antenna may not significantly affect the performance of each other when they are operated at different frequencies or at different times.

Figure 2:
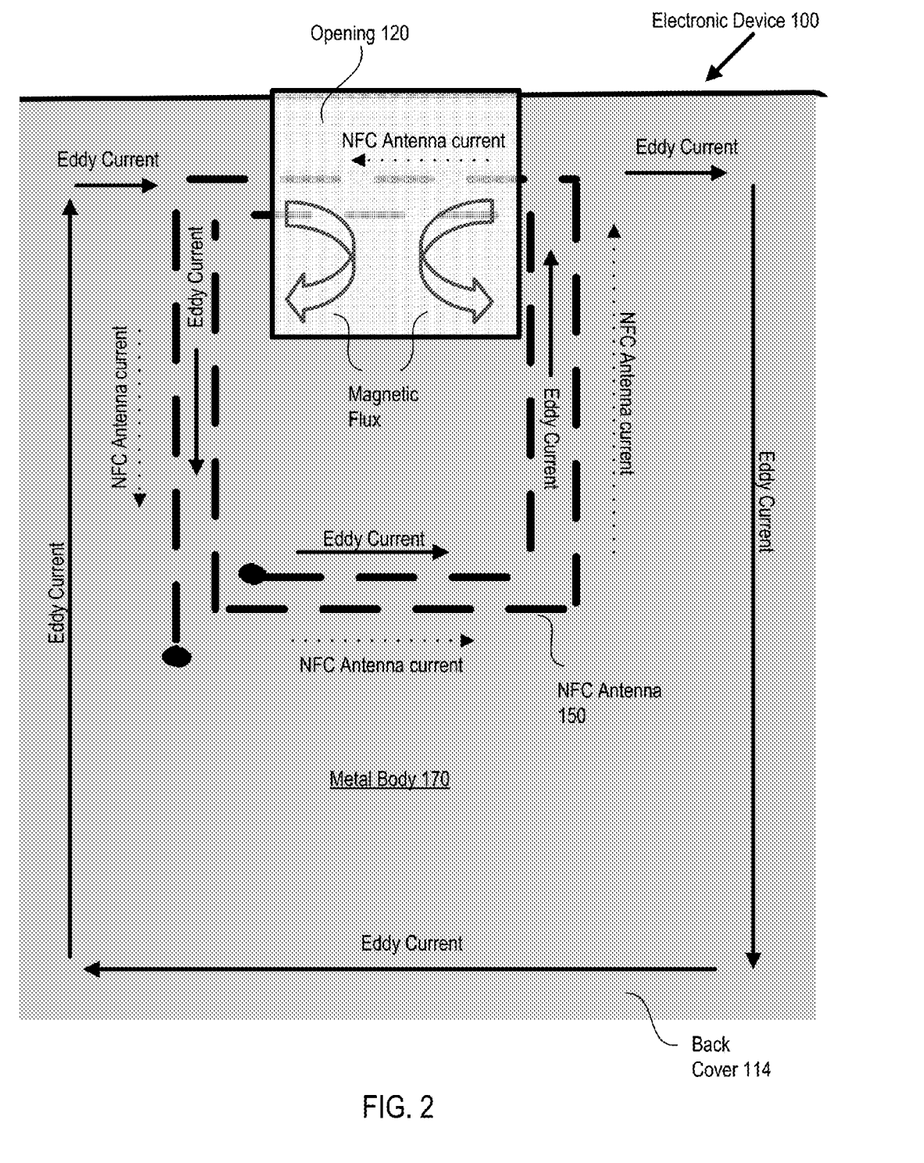
FIG. 2 illustrates an embodiment of an electronic device including a NFC antenna and a back cover including an opening forming a slot antenna.

FIG. 2 illustrates an embodiment of an electronic device 100 including an NFC antenna 150 and a slot antenna formed by an opening 120 of a metal body 170 of the electronic device 100. The electronic device 100 may include an electronic book reader, a cellular telephone, a personal digital assistant (PDAs), a portable media player, a tablet computer, a netbook, or any portable, compact electronic device. The electronic device 100 is surrounded by a front cover and a back cover (a portion of which is shown in FIG. 2). The front cover and back cover can provide structural support and can protect internal components from damage. In one embodiment shown in FIG. 2, the back cover may include the metal body 170 having the opening 120.

In an embodiment, the electronic device 100 may include a display and a keypad. The electronic device 100 may further include other components for transmitting information to and receiving information from a user, including, but not limited to, a speaker, a microphone, a vibrator, and a touchpad. As described below with respect to FIG. 7, the electronic device 100 can include other components not illustrated in FIG. 2 for ease of understanding certain aspects of specific embodiments.

The electronic device 100 includes multiple wireless communication systems. In particular, the electronic device 100 includes an NFC wireless communication system that includes, at least, an NFC antenna 150. The electronic device 100 further includes a slot antenna formed by the opening 120 of the metal body. In the embodiment illustrated in FIG. 2, the NFC antenna 150 and slot antenna formed by the opening 120 are co-located at a portion near an end or edge of a housing of the electronic device (e.g., a back cover). In an embodiment, the opening 120 may be a slot, a cutout or a combination of a slot and cutout in a housing of the electronic device 100, as described in detail below.

FIG. 2 illustrates an embodiment of an electronic device 100 including an NFC antenna 150 having an electrically conductive coil. In an embodiment, the NFC antenna 150 is disposed in proximity to a metal housing of the electronic device 100. For example, the NFC antenna 150 may be disposed in proximity to the metal housing on a flex printed circuit board, a thin wire, a ferrite sheet or a primary PCB of the electronic device 100. In one embodiment, the coil of the NFC antenna 150 is metal. For example, the coil may be fabricated as a metallic trace. In other embodiments, the coil is composed of a non-metallic conductive material.

In an embodiment, the NFC antenna 150 is coupled to the back cover 114. The NFC antenna 150 may be coupled to the back cover 114 by a non-conductive adhesive. As mentioned above, in one embodiment, the back cover 114 may composed at least partially of a metal body 170.

In one embodiment, the NFC antenna 150 may be configured to radiate at a low frequency band, such as, for example, within a frequency range of 2.5 megahertz (MHz) to 25 MHz. In one embodiment, the NFC antenna 150 radiates at approximately 13.56 MHz. In an embodiment, the metal body 170 conducts an eddy current induced in response to a current of the NFC antenna 150. In an embodiment, the opening 120 exposes at least a portion of the surface area of the NFC antenna 150 and enables the eddy current on the metal body 170 to flow in a manner such that it does not cancel the NFC antenna 150 current. Accordingly, the magnetic flux of the NFC antenna 150 passes through the opening 120 enabling radiation of the NFC antenna 150 at the first frequency band (e.g., approximately 13.56 MHz). As described in greater detail below, the slot antenna formed by the opening 120 is configured to operate at a secondary frequency band, such as a WLAN frequency band. In an embodiment, the secondary frequency band may be approximately 500 MHz to 6 GHz. For example, the slot antenna may operate at a GNSS frequency band (e.g., approximately 1.549 GHz-1.607 GHz), the WLAN (e.g., the Wi-Fi® frequency band (e.g., approximately 2.4 GHz), and the PAN (e.g., Bluetooth®) frequency band (e.g., between approximately 2.4 GHz and approximately 2.485 GHz). In a range between 120 kilohertz (kHz) to 150 kHz, at approximately 13.56 MHz, at PAN approximately 433 MHz, between 2450 MHz and 5800 MHz, or between 3.1 gigahertz (GHz) and 10 GHz. In one embodiment, the radiating frequencies of the NFC antenna 150 and slot antenna 110 are sufficiency different to avoid interference. For example, in one embodiment, the radiating frequency of the NFC antenna 150 is at least an order of magnitude lower than the radiating frequency of the slot antenna 110.

The NFC antenna 150, as a part of the NFC communication system, may communicate according to one or more NFC standards. In one embodiment, the NFC communication system uses magnetic induction between the NFC antenna 150 and another antenna of another device, each located within each other's near field, effectively forming an air-core transformer. In one embodiment, the NFC communication system has a working distance up to about 4 centimeters. In another embodiment, the NFC communication system has a working distance up to about 20 centimeters. In one embodiment, the NFC communication system transmits data at 106, 212, or 424 kbits/s. Alternatively, in other embodiments, the NFC communication system may have different working distances and communication at different data rates than those mentioned above.

Although the opening 120 has been described above as cutout of to the back cover 114, it is to be appreciated that the opening 120 may be positioned at other locations of the electronic device 100. For example, the opening may be located at any position of the electronic device which provides at least partial exposure of the NFC antenna 150.

Figure 3A:
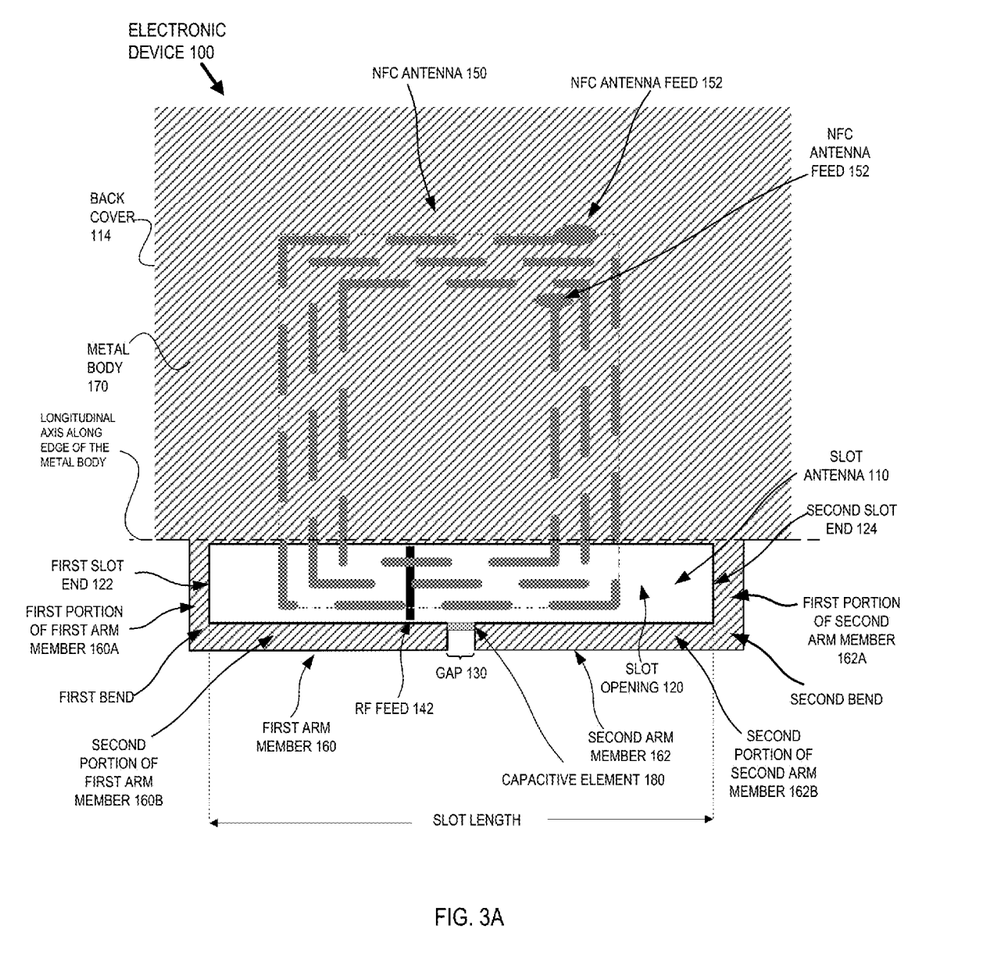
FIG. 3A illustrates a top view of an embodiment of an electronic device including an NFC antenna and a back cover including a slot opening.
Figure 3B:
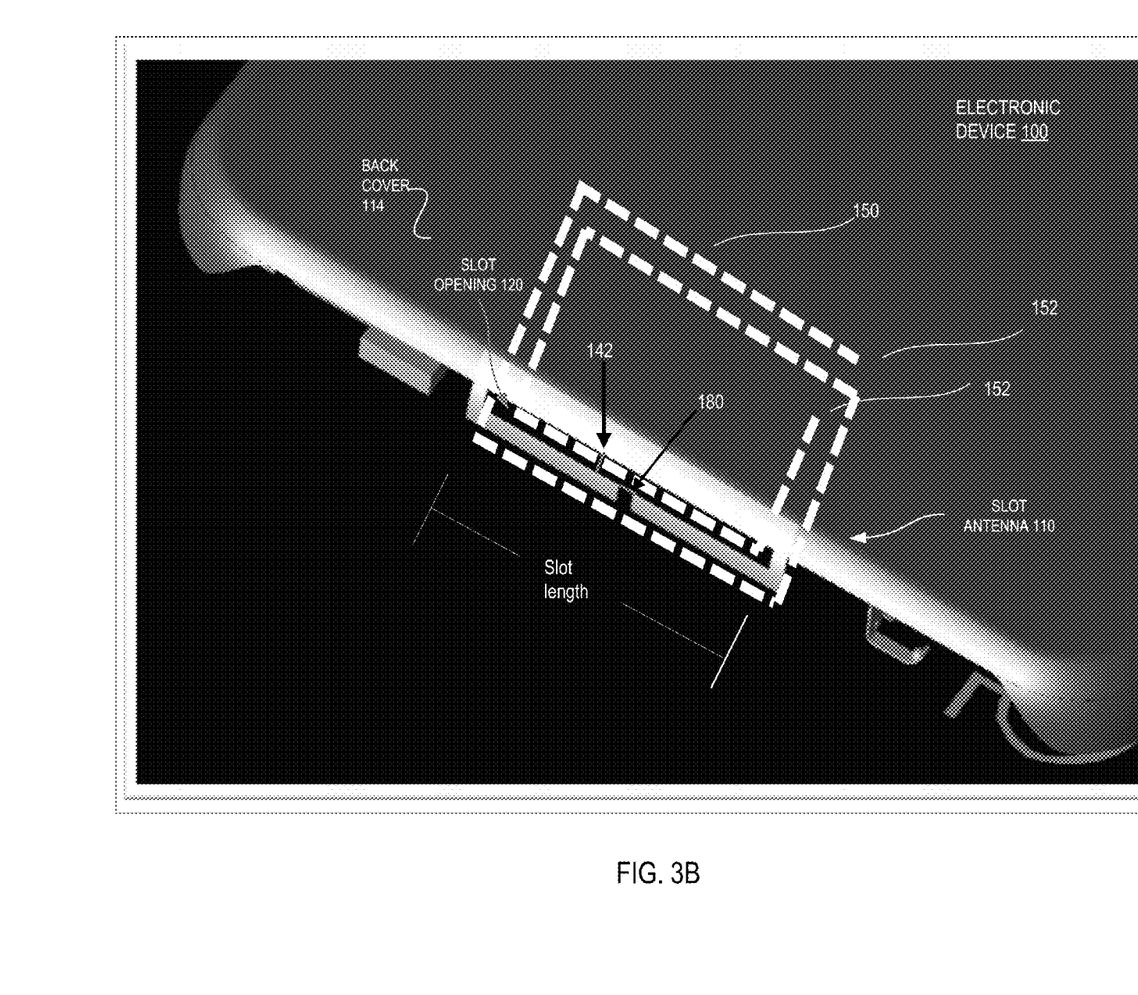
FIG. 3B illustrates a perspective view of an embodiment of an electronic device including a NFC antenna and a slot opening forming a slot antenna.

FIGS. 3A and 3B illustrate a top view and a perspective view of an embodiment of a back cover 114 of an electronic device including an NFC antenna 150 and a slot antenna 110 formed by a slot opening 120 exposing at least a portion of the NFC antenna 150. As shown in FIG. 3A, the slot opening 120 is a cutout or opening in the housing of the back cover 114 and forms a first arm member 160 and a second arm member 162 of the housing. In an embodiment, the first arm member 160 and the second arm member 162 may be formed by a discrete physical component coupled to the housing of the electronic device 100. The first arm member 160 may include a first portion 160A extending in a first direction (e.g., perpendicularly from an edge of the metal body 170) and a second portion 160B extending in a perpendicular direction relative to the first portion 160A. The first portion 160A and the second portion 160B together form the L-shaped first arm member 160. In an embodiment, the second arm member 162 includes a first portion 162A extending in the first direction (e.g., perpendicularly relative to a longitudinal axis extending along the edge of the metal body 170) and a second portion 162B extending in a perpendicular direction relative to the first portion 162A. The first portion 162A and the second portion 162B together form the L-shaped second arm member 162, wherein the second portion of the first arm member 160B extends perpendicularly from the first portion of the first arm member 160A at a first bend and the second portion of the second arm member 162B extends perpendicularly from the first portion of the second arm member 162A at a second bend. The first arm member 160 and the second arm member 162 may be any suitable width, such as, for example, 1 mm. Although the first arm member 160 and the second arm member 162 are illustrated in FIG. 3A as symmetrically shaped and sized, it is noted that the first arm member 160 and the second arm member 162 may be asymmetrically shaped and sized. The slot antenna 110 includes an RF feed 142, according to one embodiment. In an embodiment, the slot antenna 100 is formed in the material of the housing, such as a metal body 170. In one embodiment, the metal body 170 is a ground plane of a circuit board (not shown). The ground plane may be a system ground or one of multiple grounds of the user device. Alternatively, the metal body 170 may be a metallic support member of a display, a touchpad, or a touchscreen of the user device, a metallic housing, a metallic portion of a non-metallic housing, a metallic bezel, a metallic support member of a circuit board, such as a PCB, or metallic support members of other existing components, such as keyboards, buttons, displays, circuits, or the like. This metal member may also be non-structural, such as a metal member that is used for decorative or aesthetic purposes.

In an embodiment, the slot opening 120 is a cut out, a hole or other opening in the metal body 170. The dimensions of the slot opening 120 contribute to the flow of current when the RF feed 142 drives the slot antenna 110. When the metal surface is driven as an antenna by a driving frequency, the slot opening 120 radiates electromagnetic waves in a similar way to a dipole antenna. In the depicted embodiment, the slot opening 120 extends up from the gap 130 in a rectangular-shaped slot having a slot length 125 extending between a first slot end 122 and a second slot end 124. In other embodiments, the slot opening 120 may be other suitable shapes. The shape and size of the slot opening 120 (e.g., the slot length 125), as well as the driving frequency, determine the radiation distribution pattern. A slot antenna's main advantages are its size, design simplicity, robustness and convenient adaptation to mass production. In an embodiment, the slot length 125 may be approximately 22 mm. The width of the slot opening 120 may be any suitable dimension, such as for example, 0.5 mm. According to embodiments of the present disclosure, narrowing the width of the slot opening 120 increases a bandwidth of the slot antenna 110.

In the embodiment illustrated in FIG. 3A, the slot antenna 110 includes a gap 130 formed between an end portion of the first arm member 160 and the second arm member 162. In an embodiment, the gap 130 is disposed at an edge of the metal body 170 (at the bottom edge in the depicted embodiment). The gap 130 may be of any suitable size, such as for example, approximately 1 mm. In an embodiment, the slot antenna 100 includes a capacitive element 180 disposed in the gap 130. The capacitive element 180 (e.g., a capacitor) operates as an impedance matching component. The value of the capacitive element 180 may be selected to operate as an open circuit at a lower frequency (e.g. the first frequency band of the NFC antenna 150) and as a matching circuit at a higher frequency range (e.g., the second frequency band of the slot antenna 110). In an embodiment, the capacitive element 180 is selected to match an impedance of the slot antenna to an impedance of an electrically coupled transceiver to radiate in the second frequency band. In an embodiment, the value of the capacitive element 180 may be selected to tune the slot antenna 110 to a desired secondary frequency (e.g., the Wi-Fi® frequency, a GPS frequency, the Bluetooth® frequency, etc.). In an embodiment, the capacitive element may have a capacitance value of approximately 0.5 pF to 10 pF. In an embodiment, the capacitive element 180 may be approximately 0.85 pF. At the higher frequency ranges, the capacitive element 180 passes current between the first arm member 160 and the second arm member 162 and the slot antenna 110 radiates, receives or both radiates and receives electromagnetic energy in the second frequency range. The resonant frequency and impedance matching can be optimized by changing the dimension of the slot opening 120, the capacitance value of the capacitive element 180, the dimensions of the gap 130, the dimensions of the first arm member 160, the dimensions of the second arm member 162, and the position of the RF feed 142, or a combination thereof.

The RF feed 142 may be a feed line connector that couples the slot antenna 110 to a feed line (also referred to as the transmission line), which is a physical connection that carriers the RF signal to and/or from the slot antenna 110. The feed line connector may be any one of the three common types of feed lines, including coaxial feed lines, twin-lead lines, waveguides, or the track as described herein. A waveguide, in particular, is a hollow metallic conductor with a circular or square cross-section, in which the RF signal travels along the inside of the hollow metallic conductor. Alternatively, other types of connectors can be used. In the depicted embodiment, the feed line connector is directly connected to slot antenna 110 via the RF feed 142. Different feeding mechanisms can be used, such as a track feed, a co-planar feed, a trace feed, a coaxial feed, twin-lead lines, a waveguide or the like. The coplanar feed may be coplanar with the metal body 170 (e.g., ground plane).

It should be noted that an electrical field of a slot antenna 110 is constrained across the slot opening 120 so that the actual field will be at right angles to the axis of the slot opening 102. Embodiments of the slot antenna 110 allow the miniaturization of the antenna, providing a smaller antenna design than conventional antenna structure.

In an embodiment, the RF feed 142 is disposed in an off-center position relative to the slot opening 120. In the depicted embodiment, the RF feed 142 is disposed to the left of the gap 130. Alternatively, the RF feed 142 can be disposed on the right side of the gap 130. In other embodiments, the RF feed 142 may be disposed in other locations.

In one embodiment, the metal body 170 is a structural member of the user device. The structural member may be a metallic support member that supports a circuit board of the user device, a metallic support member that supports a display of the user device, a metallic support member that supports a user input device, a metal back panel of an assembly that supports the circuit board, a metallic housing of the user device, a metal portion of a non-metallic housing of the user device, or a metallic bezel of the user device. Alternatively, the structural member may be a metallic support member that supports a user input device, such as a touch screen, touchpad, or touch panel. Alternatively, other structural members of the user device may be used. In other embodiments, the metal body 170 is a non-structural member of the user device, such as metal that is used for ornamental or aesthetic purposes.

In the depicted embodiment, the slot antenna 110 is configured to radiate at the slot opening 120 and gap 130 disposed between the first arm member 160 and the second arm member 162. The slot opening 120 is configured to operate as a slot antenna radiator with the RF feed 142. The feed location, the distance between the feed location and the grounding point, and the area of the slot opening 120 contribute to resonant frequencies of the slot antenna 100. In one embodiment, the slot opening 120 is configured to operate as a WLAN antenna. Most modern WLAN antennas are based on IEEE 802.11 standards, marketed under the Wi-Fi® brand name. The WLAN antenna may cover a WLAN frequency band, such as the Wi-Fi® frequency bands of 2.45 GHZ, 5 GHz or both. The Wi-Fi frequency bands may also include 3.7 GHz. In one embodiment, the slot antenna 100 is configured to operate at the Wi-Fi® frequency bands, GPS frequency bands, Bluetooth® frequency bands, etc. In an embodiment, the slot antenna 110 can be configured to radiate at other frequency ranges as would be appreciated by one of ordinary skill in the art having the benefit of this disclosure. For example, other frequency bands may be achieved by changing the RF feed location, the distance between the feed location and the grounding point, the area of the slot opening 120, as well as other dimensions of the slot antenna 110. In some embodiments, the slot opening 120 is an air gap. In another embodiment, dielectric material may be disposed between the slot opening 120 and the metal body 170.

As shown in FIGS. 3A and 3B, the NFC antenna 150 includes NFC antenna feeds 152. The NFC antenna feeds 152 may be a feed line connector that couples the NFC antenna 150 to a feed line (also referred to as the transmission line), which is a physical connection that carriers the RF signal to and/or from the NFC antenna 150. The feed line connector may be any one of the three common types of feed lines, including coaxial feed lines, twin-lead lines, waveguides, or the track as described herein. A waveguide, in particular, is a hollow metallic conductor with a circular or square cross-section, in which the RF signal travels along the inside of the hollow metallic conductor. Alternatively, other types of connectors can be used. In the depicted embodiment, the feed line connector is directly connected to NFC antenna 150 via the NFC antenna feeds 152. Different feeding mechanisms can be used, such as a track feed, a co-planar feed, a trace feed, a coaxial feed, twin-lead lines, a waveguide or the like. The coplanar feed may be coplanar with the metal body 170 (e.g., ground plane).

As described above, the NFC antenna 150 is at least partially exposed by the slot opening 120 and operates at approximately 13.56 megahertz (MHz).

Figure 4A:
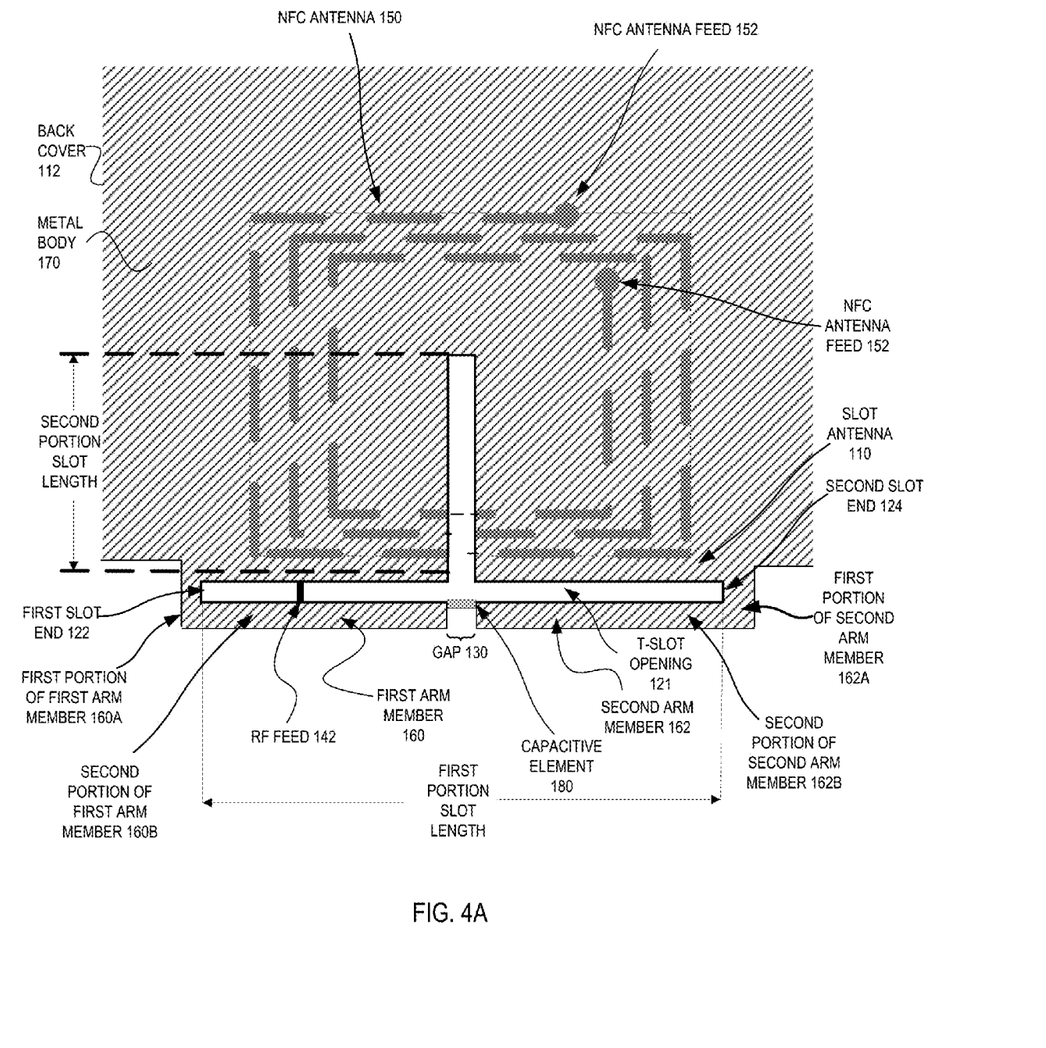
FIG. 4A illustrates a top view of an embodiment of an electronic device including an NFC antenna and a back cover including a T-slot opening.
Figure 4B:
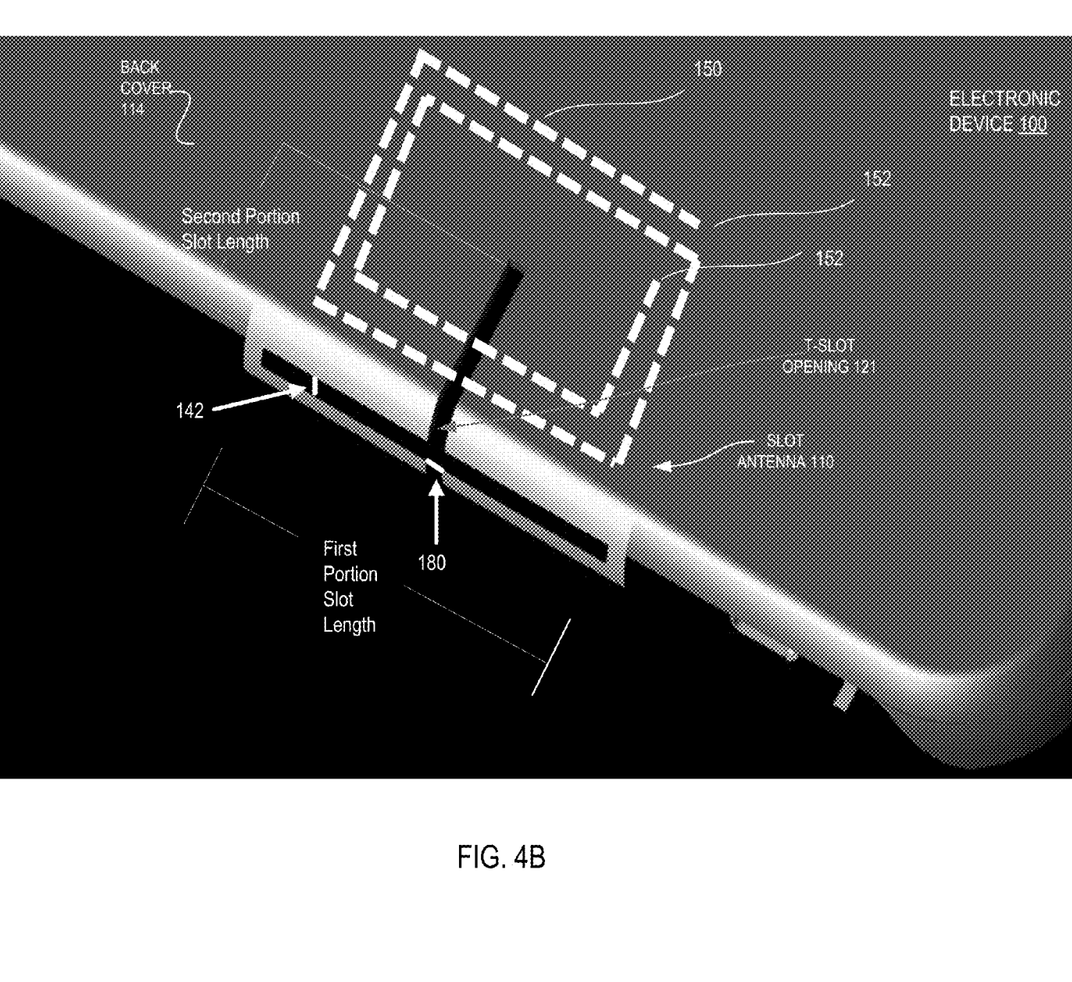
FIG. 4B illustrates a perspective view of an embodiment of an electronic device including a NFC antenna and a T-slot opening forming a slot antenna.

In the embodiment illustrated in FIGS. 4A and 4B (top view and perspective view, respectively), the electronic device 100 includes a slot antenna 110 formed from a T-slot opening 121 in a metal body 170 of the electronic device 100. As illustrated in FIG. 4A, the T-slot opening 121 is a cutout or opening in the housing of the back cover 114 and forms a first arm member 160 and a second arm member 162 of the housing. The first arm member 160 may include a first portion 160A extending in a first direction (e.g., toward an edge of the metal body 170) and a second portion 160B extending in a perpendicular direction relative to the first portion 160A. The first portion 160A and the second portion 160B together form the L-shaped first arm member 160. In an embodiment, the second arm member 162 includes a first portion 162A extending in the first direction (e.g., toward the edge of the metal body 170) and a second portion 162B extending in a perpendicular direction relative to the first portion 162A. The first portion 162A and the second portion 162B together form the L-shaped second arm member 162.

The T-slot opening 121 includes a first rectangular portion extending from a first slot end 122 to a second slot end 124) and a second rectangular portion extending from the gap 130 in a perpendicular direction relative to the first rectangular portion. The first rectangular portion and the second rectangular portion form the T-shaped T-slot opening 121. The second portion slot length of the T-slot opening 121 may be any suitable length, such as, for example, 8.6 mm. The second rectangular portion of the T-slot opening 121 may be configured to expose at least a portion of the NFC antenna 150, as shown in FIGS. 4A and 4B. The first portion slot length and the second portion slot length of the T-slot opening 121 may be selected in order to tune the frequency of the slot antenna 110.

In an embodiment, as shown in FIG. 4A, the RF feed 142 of the slot antenna 110 formed by the T-slot opening 121 may located at any suitable position, such as for example, 7 mm from the first slot end 122. Although the first rectangular portion of the T-slot opening 121 is shown in FIGS. 4A and 4B as being symmetrically positioned relative to the second rectangular portion (e.g., the length of the second portion of the first arm member 160B is equal to the length of the second portion of the second arm member 162B), it is noted that the T-slot opening 121 may be asymmetrically oriented (e.g., the second portion of the first arm member 160B may be a different length than the second portion of the second arm member 162B). According to embodiments of the present disclosure, the description above relating to FIGS. 3A and 3B is applicable to the common elements illustrated in FIGS. 4A and 4B.

Figure 5A:
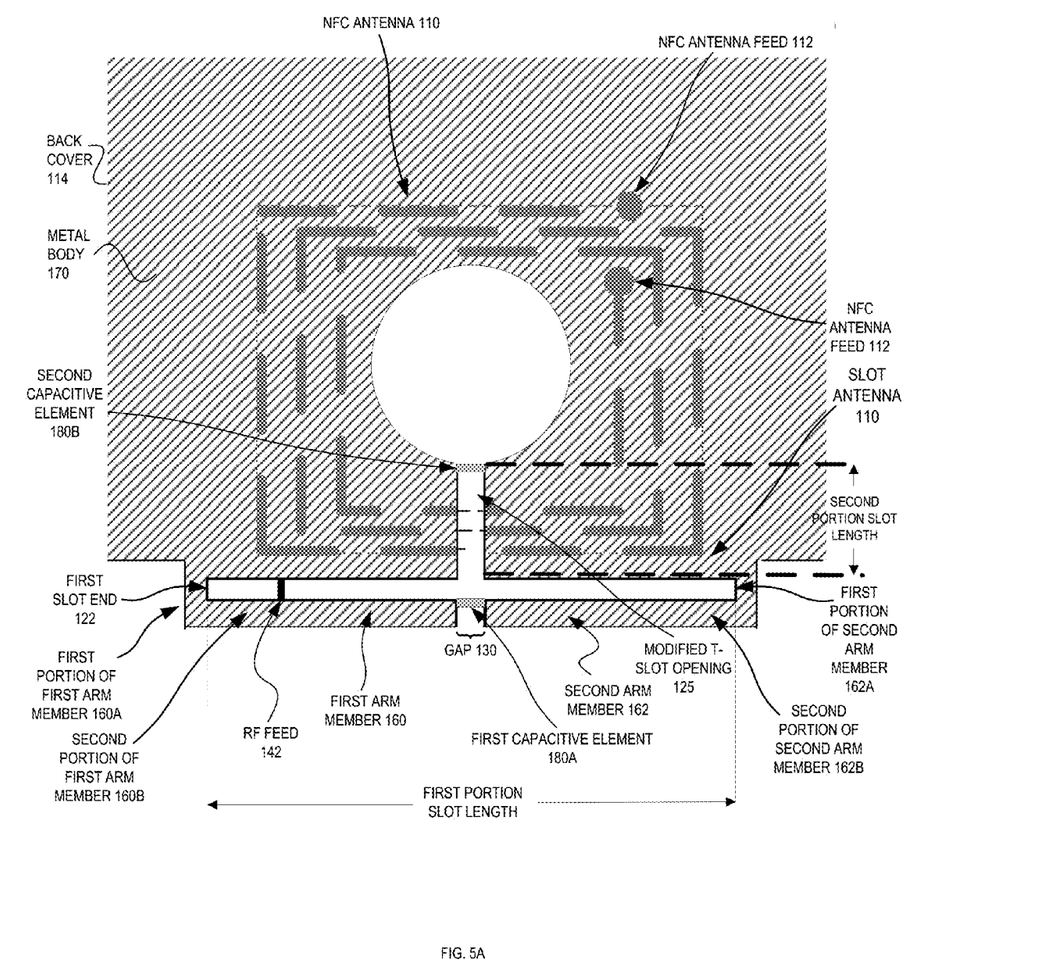
FIG. 5A illustrates a top view of an embodiment of a back cover of an electronic device including an NFC antenna and a back cover including a T-slot opening in communication with a circular opening forming a slot antenna.
Figure 5B:
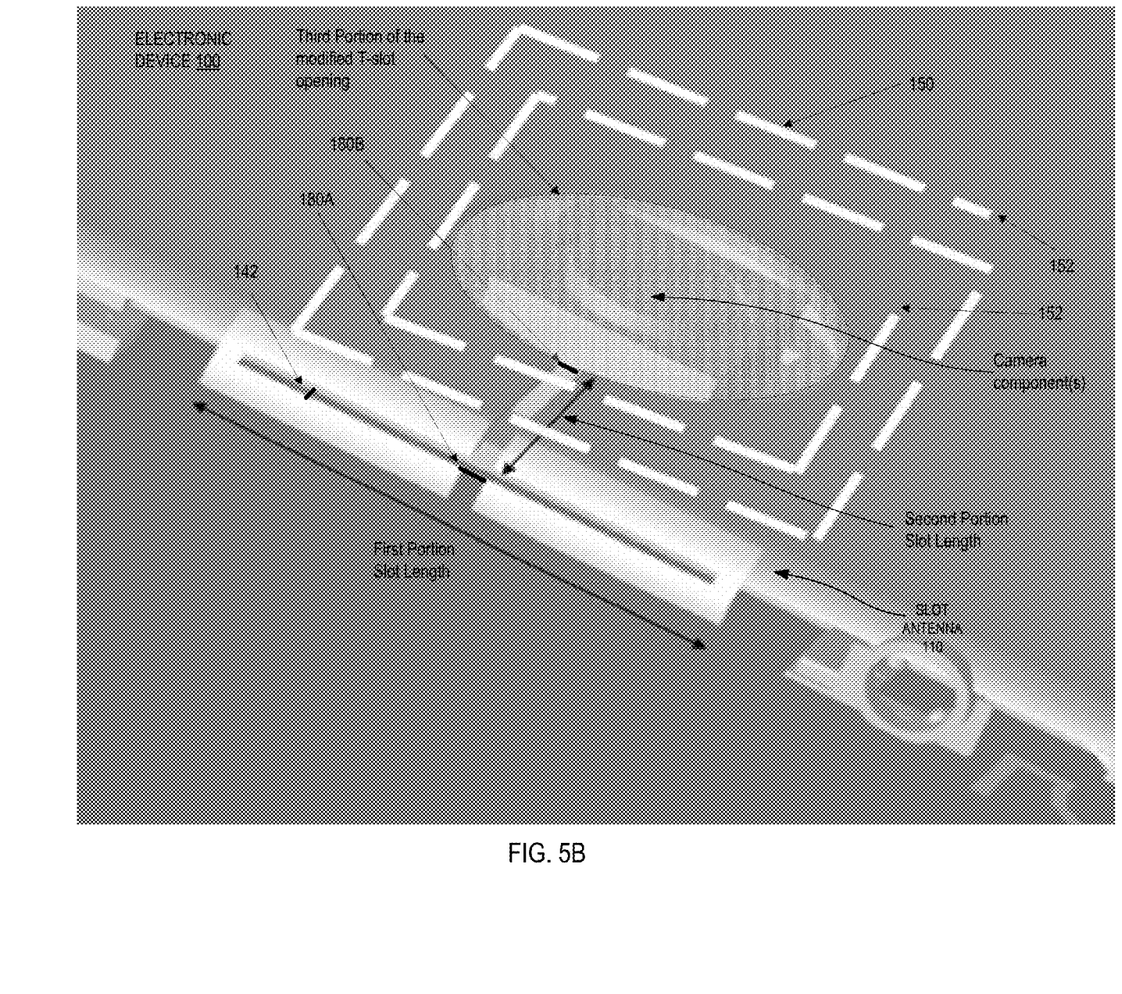
FIG. 5B illustrates a perspective view of an embodiment of an electronic device including a NFC antenna and a modified T-slot opening including a circular opening forming a slot antenna.

FIGS. 5A and 5B illustrate a top view and a perspective view of an embodiment of electronic device 100 including an NFC antenna 150 and a modified T-slot opening 125 including a first rectangular portion, a second rectangular portion and a third portion. As shown in FIGS. 5A and 5B, the first rectangular portion and the second rectangular portion of the modified T-slot opening 125 for a T-shaped opening leading into the third portion of the modified T-slot opening 125. As illustrated in FIGS. 5A and 5B, the third portion of the modified T-slot opening 125 is circular, however, the third portion may be any suitable shape (e.g., rectangular, square, etc.). In an embodiment, the third portion of the modified T-slot opening 125 may be a standard or existing cut out or opening of the electronic device 100 used to provide an opening for one or more camera components of the electronic device 100.

The modified T-slot opening 125 in the metal body 170 forms a slot antenna 110 including a first capacitive element 162A and a second capacitive element 162B. In an embodiment, the first capacitive element 162A is disposed between the gap 130 formed between the ends of the first arm member 160 and the second arm member 162. In an embodiment, the value of the first capacitive element 180A may be selected to tune the slot antenna 110 to a desired secondary frequency (e.g., the Wi-Fi® frequency, a GNSS frequency, the Bluetooth® frequency, etc.) In an embodiment, the first capacitive element may have a capacitance value of approximately 0.5 pF to 10 pF. In an embodiment, the first capacitive element 180A may be approximately 0.7 pF.

As shown in FIGS. 5A and 5B, the second capacitive element 180B may be located at or near a junction between the second rectangular portion and the third portion of the modified T-slot opening 125. In an embodiment, the value of the second capacitive element 180B may be selected to tune the slot antenna 110 to a desired secondary frequency (e.g., the Wi-Fi® frequency, a GPS frequency, the Bluetooth® frequency, etc.) In an embodiment, the second capacitive element may have a capacitance value of approximately 20.0 pF to 100 pF. In an embodiment, the second capacitive element 180A may be approximately 20.0 pF. As described above, the first portion slot length and the second portion slot length of the modified T-slot opening 125 may be selected in order to tune the frequency of the slot antenna 110.

In an embodiment, the modified T-slot opening 125 is configured to expose at least a portion of the NFC antenna 150, as shown in FIGS. 5A and 5B. The NFC antenna 150 of FIGS. 5A and 5B is substantially similar to the NFC antenna 150 of FIGS. 3A, 3B, 4A, and 4B. According to embodiments of the present disclosure, the first rectangular portion of the modified T-slot opening 125 may be disposed at any location between an edge of the electronic device 100 (e.g., an edge of the metal body 170) and the third portion of the modified T-slot opening 125.

Figure 6:
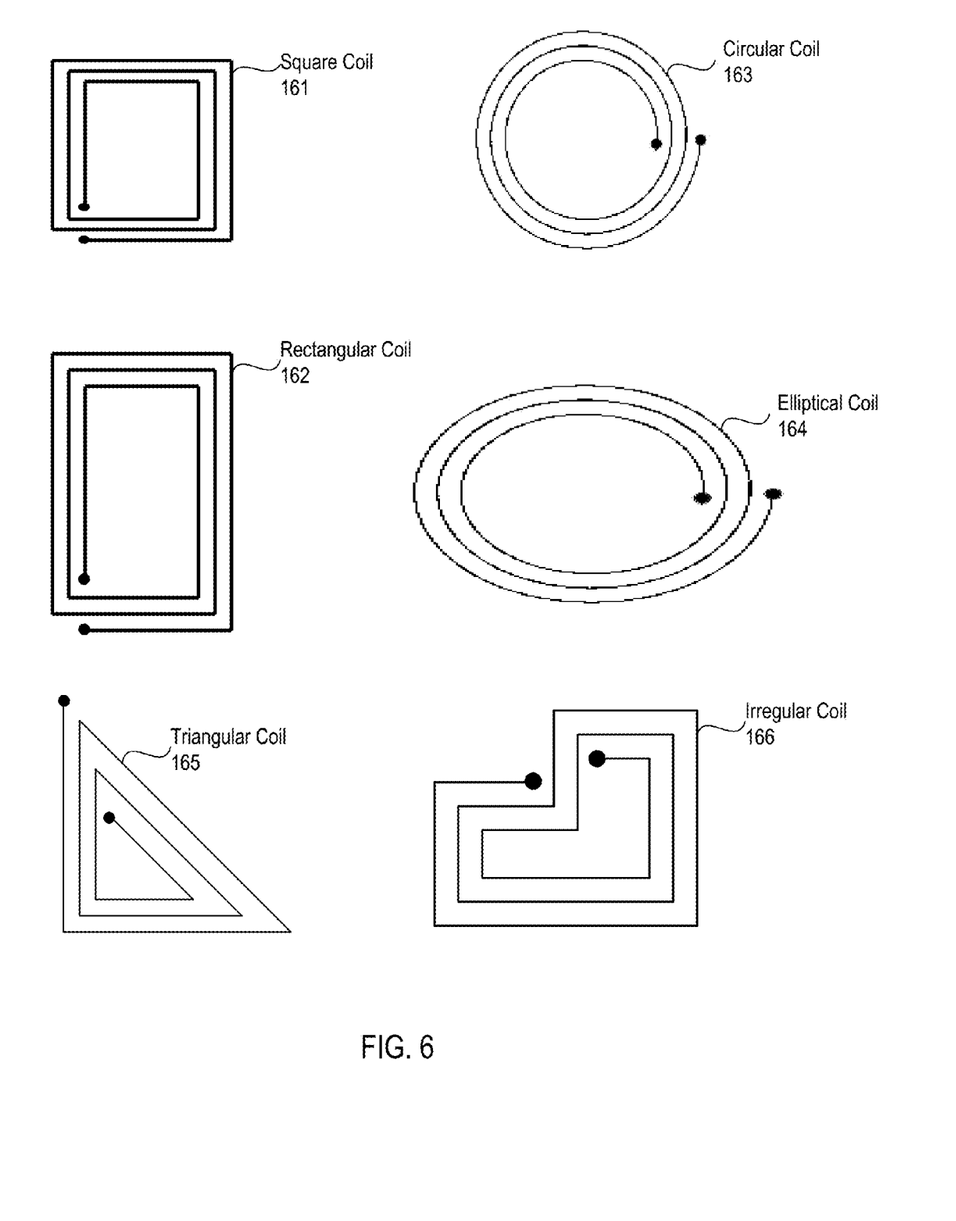
FIG. 6 illustrates embodiments of exemplary shapes of the NFC antenna coil.

FIG. 6 illustrates different embodiments of the shape of a coil structure of the NFC antenna 150. Each of the coils 161-166 may be used as the coil of an NFC antenna, such as the NFC antenna 150 of FIGS. 3A-5B. The square coil 161 includes a number of straight segments. In particular, the square coil 161 has a length in a first dimension that is approximately the same as a length in a second, perpendicular dimension. The rectangular coil 162 includes a number of straight segments. In particular, the rectangular coil 162 has a length in a first dimension that is different than a length in a second, perpendicular dimension. The circular coil 163 includes a number of curved segments. In particular, the circular coil 163 has a length in a first dimension that is approximately the same as a length in a second, perpendicular dimension. The elliptical coil 164 includes a number of curved segments. In particular, the elliptical coil 164 has a length in a first dimension that is different than a length in a second, perpendicular dimension. The triangular coil 165 includes a number of straight segments. The irregular coil 166 includes a number of straight segments, but can also include round segments, and may be formed in any shape. It should be note that each of the above noted shapes may be distorted somewhat from their namesakes and still be considered to have such a named shape. For example, the segments of the square shaped coil may be slightly curved as opposed to straight and the coil would still be considered to be squared shape. As another example, the segments of the square shaped coil may be connected by rounded corners and still be considered to be squared shape.

Although the coil shapes illustrated in FIG. 6 are constrained to a generally planar shape, it is to be appreciated that the coil may be formed in three dimensions. In particular, the coil may include segments that extend in more than one plane such that the intersections of the segments are non-coplanar.

Figure 7:
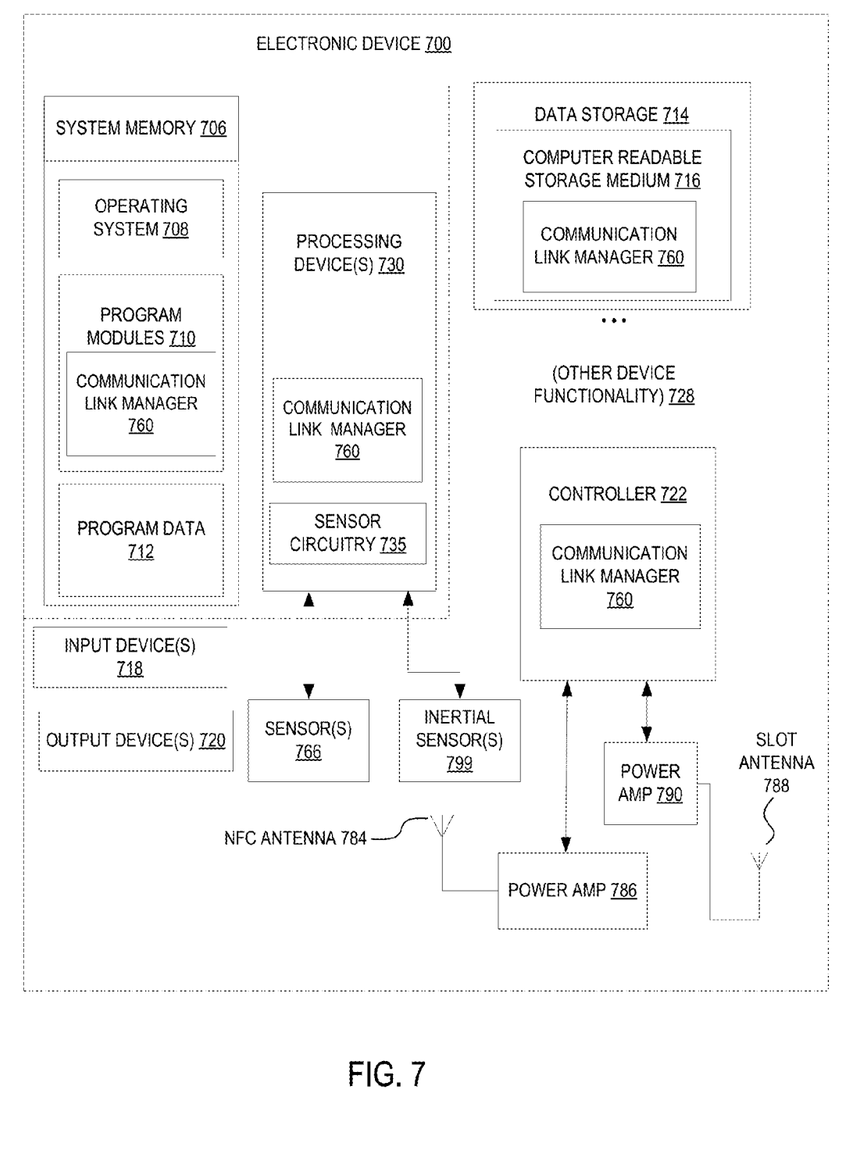
FIG. 7 illustrates an exemplary electronic device including a NFC antenna and a slot antenna according to an embodiment of the present disclosure.

FIG. 7 illustrates an exemplary electronic device 700 including the NFC antenna and slot antenna according to one embodiment. The electronic device 700 may correspond to the electronic device 100 of FIGS. 2-5B and may be any type of computing device such as an electronic book reader, a PDA, a mobile phone, a laptop computer, a portable media player, a tablet computer, a smart phone, a camera, a video camera, a netbook, a desktop computer, a gaming console, a digital video disc (DVD) player, a computing pad, a media center, and the like.

The electronic device 700 includes one or more processing devices 730, such as one or more central processing units (CPUs), microcontrollers, field programmable gate arrays, or other types of processing devices. The electronic device 700 also includes system memory 706, which may correspond to any combination of volatile and/or non-volatile storage mechanisms. The system memory 706 may include one or more of read-only memory (ROM), flash memory, dynamic random access memory (DRAM) such as synchronous DRAM (SDRAM)), and static random access memory (SRAM)). The system memory 706 stores information which provides an operating system component 708, various program modules 710 such as communication link manager 760, program data 712, and/or other components. The electronic device 700 performs functions by using the processing device(s) 730 to execute instructions provided by the system memory 706.

The electronic device 700 also includes a data storage device 714 that may be composed of one or more types of removable storage and/or one or more types of non-removable storage. The data storage device 714 includes a computer-readable storage medium 716 on which is stored one or more sets of instructions embodying any one or more of the methodologies or functions described herein. As shown, instructions for the communication link manager 760 may reside, completely or at least partially, within the computer readable storage medium 716, system memory 706 and/or within the processing device(s) 730 during execution thereof by the electronic device 700, the system memory 706 and the processing device(s) 730 also constituting computer-readable media. The electronic device 700 may also include one or more input devices 718 (keyboard, mouse device, specialized selection keys, etc.) and one or more output devices 720 (displays, printers, audio output mechanisms, etc.). In one embodiment, the input devices 718 and the output devices 320 may be combined into a single device (e.g., a touch screen).

The electronic device 700 further includes a wireless controller 722 to allow the electronic device 700 to wirelessly communicate with other computing devices. The wireless controller 722 allows the electronic device 700 to handle both voice and non-voice communications (such as communications for text messages, multimedia messages, media downloads, web browsing, etc.). The wireless controller 722 may also allow the electronic device 700 to handle other signaling data to facilitate communication of the voice and non-voice data between the electronic device 700 and other devices. The wireless controller 722 may provide network connectivity using any type of mobile network technology including, for example, cellular digital packet data (CDPD), general packet radio service (GPRS), enhanced data rates for global evolution (EDGE), universal mobile telecommunications system (UMTS), 1 times radio transmission technology (1×RTT), evaluation data optimized (EVDO), high-speed down-link packet access (HSDPA), Wi-Fi®, HSPA+, WiMAX, Long Term Evolution (LTE) and LTE Advanced (sometimes generally referred to as 4G), etc. In one embodiment, the wireless modem includes the communication link manager 760 in addition to, or instead of, the communication link manager 760 being included in the computer readable storage medium 716, system memory 706 and/or processing device(s) 730. The communication link manager 760 may be implemented as hardware, firmware and/or software of the wireless controller 722. It should be noted that the controller 722 may include a processing component that performs various operations to handle both voice and non-voice communications. This processing component can execute the communication link manager 760. Alternatively, the communication link manager 760 can be executed by a processing component of the electronic device, such as the processing device 730.

The wireless controller 722 may generate signals and send these signals to power amplifiers (amp) 786 and 790 for amplification, after which they are wirelessly transmitted via NFC antenna 784 or slot antenna 788. In one embodiment, the power amplifiers 786 and 790 are part of the controller 722. In another embodiment, the controller 722 is directly coupled to the NFC antenna 784 and the slot antenna 788. In one embodiment, the NFC antenna 784 may correspond to the NFC antenna 150 of FIGS. 2-5B. According to embodiments of the present disclosure, the slot antenna 788 may correspond to the slot antenna 110 of FIGS. 2-5B. The NFC antenna 784 and slot antenna 788 may be directional, omni-directional or non-directional antennas. In addition to sending data, the NFC antenna 784 and slot antenna 788 can be deployed to receive data, which is sent to wireless controller 722 and transferred to processing device(s) 730. In one embodiment, the NFC antenna 784 and the slot antenna 788 may be used to form communication links between the electronic device 300 and a base station (e.g., a NodeB, an eNodeB or a cell tower).

The processing device(s) 730 and the controller 722 may be general-purpose processing devices, such as a microprocessor, a central processing unit, or the like. More particularly, the processing device(s) 730 and the controller 722 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device(s) 730 and the controller 722 may also be one or more special-purpose processing devices such as an application specific integrated circuit (ASIC), a field programmable gate array (FPGA), a digital signal processor (DSP), network processor, or the like.

In one embodiment, electronic device 700 includes one or more sensors 766 such as a physical contact sensor or close proximity sensors. The sensors 766 can detect the human body parts proximate to the electronic device, and convey information regarding the detection to processing device(s) 730. In one embodiment, the sensors 766 may be capacitive sensors that are configured to measure capacitance generated by the human body part proximate to the electronic device using any one of various techniques known in the art, for example, relaxation oscillation, a current verses voltage phase shift comparison, resistor-capacitor charge timing, capacitive bridge division, charge transfer, sigma-delta modulation, or charge-accumulation. In an alternative embodiment, the sensors 766 may also be optical (e.g., infrared) sensors that use an emitter and receiver pair to detect the presence of opaque objects. Alternatively, the sensors 766 may be inductive sensors, which include an inductive loop. When the presence of a human body part (or metal object) is brought close to the inductive sensor, an induction of the inductive loop changes, causing the human body part to be detected. Alternatively, the sensors 766 may be ultrasonic sensors that emit an ultrasonic signal and measure a time duration between when a signal is transmitted and the reflection of that signal received (a.k.a., flight response). The sensors 766 may also include other types of sensors, such as those that operate using the detection principles of resistive (e.g., analog resistive, digital resistive or residual resistive), surface acoustic wave, electromagnetic, near field imaging, or other technologies. In one embodiment, multiple different types of sensors are used. It should also be noted that the sensors 766 may be used to determine a distance between one or more of the antennas and the detected human body part. Though the detected object is described herein as a human body part, other types of objects may also be detected depending on the sensing technologies used.

In one embodiment, electronic device 700 includes one or more inertial sensors 799. The inertial sensors 799 can be used to detect motion of the electronic device 700. In one embodiment, the inertial sensors 799 detect linear accelerations (translational movement) and angular accelerations (rotational movement). The inertial sensors 799 may include accelerometers and/or gyroscopes. Gyroscopes use principals of angular momentum to detect changes in orientation (e.g., changes in pitch, roll and twist). Accelerometers measure accelerations along one or more axes (e.g., translational changes). The gyroscope and accelerometer may be separate sensors, or may be combined into a single sensor. The inertial sensors 799 in one embodiment are micro-electromechanical systems (MEMS) sensors.

In one embodiment, the motion data from the one or more inertial sensors 799 may be used to determine an orientation of the electronic device 700 to determine if a communication link criterion is satisfied (e.g., whether the electronic device 700 is in proximity to a user's body). In another embodiment, the sensor data from the one or more sensors 766 may be used to determine an orientation of the electronic device 700 for to determine if a communication link criterion is satisfied. In a further embodiment, of the motion data and the sensor data may be used to determine whether a communication link criterion is satisfied.

The processing device(s) 730 may include sensor circuitry 735 (e.g., sensor device drivers) that enables the processing device(s) 730 to interpret signals received from the sensor(s) 766 and/or inertial sensors 799. In one embodiment, the sensors 766 and/or inertial sensors 799 output fully processed signals to the processing device(s) 730. For example, the sensors 766 may output a distance, a detected/not detected signal, etc. using a single line interface or a multi-line interface. Similarly, inertial sensors 799 may output an acceleration value (e.g., in Gs). In another embodiment, the sensors 766 output, for example, positional data and/or object presence data (e.g., of a human body part) to the processing devices) 730 without first processing the data. Similarly, inertial sensors 799 may output, for example, voltage values that can be interpreted as acceleration values. In either instance, the processing device(s) 730 may use the sensor circuitry 735 to process and/or interpret the received data. If data is received from multiple sensors 766 and/or inertial sensors 799, processing the data may include averaging the data, identifying a maximum from the data, or otherwise combining the data from the multiple sensors. In one embodiment, in which the sensors 766 include a sensor array, numerous sensors, or a touch panel, processing the data includes determining where on the electronic device the human body part is located from multiple sensor readings.

In the above description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the description.

It is to be understood that the above description is intended to be illustrative, and not restrictive. Many other embodiments will be apparent to those of skill in the art upon reading and understanding the above description. The scope of the present disclosure should, therefore, be determined with reference to the appended claims, along with the full scope of equivalents to which such claims are entitled.

What is claimed is:

1. An electronic device comprising:
a circuit board comprising a transceiver and a ground plane;
a first radio frequency (RF) feed electrically coupled to the transceiver;
a near field communication (NFC) antenna having an electrically conductive coil and configured to:
  receive a first electrical current via the first RF feed and generate an NFC current; and
  radiate RF energy in a first frequency band; and
a metal body electrically coupled to the ground plane, wherein the metal body conducts a current generated in response to the NFC current;
a slot antenna formed by:
  a first arm member coupled to the metal body, the first arm member comprising a first portion and a second portion, wherein the first portion of the first arm member extends perpendicularly relative to a longitudinal axis extending along an edge of the metal body to a first bend and the second portion of the first arm member extends from the first bend in a perpendicular direction relative to the first portion of the first arm member,
  a second arm member coupled to the metal body, the second arm member comprising a first portion and a second portion, wherein the first portion of the second arm member extends perpendicularly relative to the longitudinal axis extending along the edge of the metal body to a second bend and the second portion of the second arm member extends from the second bend perpendicularly from the first portion of the second arm member,
  wherein a slot opening is formed by the first arm member and the second arm member;
a second RF feed electrically coupled to the transceiver and a portion of the first arm member, and
a capacitive element to electrically couple the first arm member and the second arm member and conduct a second electrical current transmitted by the second RF feed to cause the slot antenna to radiate in a second frequency band,
wherein the slot opening allows the NFC current to flow without cancellation by the induced current.

2. The electronic device of claim 1, wherein the first frequency band comprises a range between 2.5 megahertz (MHz) and 25 MHz, and wherein the second frequency band comprises a range between 500 MHz and 6 gigahertz (GHz).

3. The electronic device of claim 1, wherein the second RF feed is coupled to the first arm member at a first offset position relative to a location of the first bend.

4. The electronic device of claim 1, wherein the metal body comprises a metal housing of the electronic device.

5. An electronic device comprising:
a circuit board comprising a transceiver and a ground plane;
a first radio frequency (RF) feed electrically coupled to the transceiver;
a near field communication (NFC) antenna coupled to the first RF feed, the NFC antenna configured to radiate electromagnetic energy in a first frequency band in response to a first electrical current applied at the first RF feed;
a metal body electrically coupled to the ground plane and proximally located relative to the NFC antenna, the metal body comprising a first arm member and a second arm member; and
an antenna including a slot opening formed by the first arm member and the second arm member of the metal body, the antenna comprising:
  a second RF feed electrically coupled to the transceiver, and
  a capacitive element electrically coupling the first arm member and the second arm member of the metal body, the antenna to radiate electromagnetic energy in a second frequency band in response to a second electrical current applied at the second RF feed.

6. The electronic device of claim 5, wherein the first frequency band comprises a range between 2.5 megahertz (MHz) and 25 MHz, and wherein the second frequency band comprises a range between 500 MHz and 6 gigahertz (GHz).

7. The electronic device of claim 5, wherein the second frequency band comprises at least one of wireless local area network (WLAN) frequency band, a global navigation satellite system (GNSS) frequency band, or a personal area network (PAN) frequency band.

8. The electronic device of claim 5, wherein a length the slot opening is selected to tune the antenna to radiate in the second frequency band.

9. The electronic device of claim 5, wherein the NFC antenna is disposed in a first plane and the metal body is disposed in a second plane, wherein the slot opening is positioned relative to the NFC antenna such that at least a portion of the NFC antenna is not covered by the metal body.

10. The electronic device of claim 5, wherein the capacitive element matches an impedance of the antenna including the slot opening to an impedance of a radio frequency (RF) circuit disposed on the circuit board to radiate electromagnetic energy in the second frequency band.

11. The electronic device of claim 10, wherein a value of the capacitive element comprises approximately 0.85 picofarads (pF).

12. An electronic device comprising:
a circuit board comprising a transceiver and a ground plane;
a first radio frequency (RF) feed electrically coupled to the transceiver;
a near field communication (NFC) antenna coupled to the first RF feed, the NFC antenna configured to radiate in a first frequency band in response to receiving a first electrical current transmitted by the first RF feed;
a metal body electrically coupled to the ground plane and proximally located relative to the NFC antenna, the metal body comprising a first arm member and a second arm member; and
an antenna including an opening formed by the first arm member and the second arm member, the antenna comprising a second RF feed electrically coupled to the first arm member of the metal body, wherein the antenna radiates in a second frequency band in response to receiving a second electrical current transmitted by the second RF feed.

13. The electronic device of claim 12, wherein the antenna further comprises a first capacitive element electrically coupling the first arm member and the second arm member.

14. The electronic device of claim 13, wherein the antenna further comprises a second capacitive element.

15. The electronic device of claim 14, wherein a first value of the first capacitive element, a second value of the second capacitive element, and a length of the opening are selected to match an impedance of the antenna to an impedance of a transceiver of the electronic device to radiate in the second frequency band.

16. The electronic device of claim 15, wherein the first value of the first capacitive element comprises approximately 0.7 picofarads (pF) and the second value of the second capacitive element comprises approximately 20 pF.

17. The electronic device of claim 12, wherein a portion of the opening comprises a cut out for one or more camera components of the electronic device.

18. The electronic device of claim 17, wherein the second frequency band comprises at least one of a wireless local area network (WLAN) frequency band, a global positioning system (GPS) frequency band, or a personal area network (PAN) frequency band.

19. The electronic device of claim 12, wherein the opening allows a current of the NFC antenna to flow without cancellation by a current conducted by the metal body.

20. The electronic device of claim 12, wherein at least a portion of the opening is circular.

* * * * *